March 14, 1967   W. C. EULISS   3,308,804
BREAD WARMER ATTACHMENT FOR OUTDOOR GRILLS
Filed Oct. 22, 1965

INVENTOR.
Wade C. Euliss
BY  B. B. Olive
ATTORNEY

United States Patent Office 3,308,804
Patented Mar. 14, 1967

3,308,804
BREAD WARMER ATTACHMENT FOR OUTDOOR GRILLS
Wade C. Euliss, Rte. 1, Box 120,
Burlington, N.C. 27215
Filed Oct. 22, 1965, Ser. No. 500,758
6 Claims. (Cl. 126—25)

This invention relates generally to an improvement in a picnic cooking device and, more particularly, to a charcoal grill having the improvement of a bread warmer attached thereto.

The use of barbeque grills for outdoor cooking has now become widespread with more people participating in this form of outdoor relaxation every year. Barbeque grills of the common type consist only of a charcoal receiving receptacle, support means for the receptacle and a grid placed over the receptacle for receiving meat, vegetables and the like. When cooking meats such as hamburgers or hot dogs which are generally eaten with buns or bread, the buns must be warmed in an indoor range and brought to the outside location. In most instances, the buns are cold before the charcoaled meat is combined therewith either due to the distance traversed by the carrier of the buns or because all the meat is seldom ready to be served when the bread or buns arrive. It can be seen that the art of outdoor cooking would be advanced by providing an outdoor grill with a means for warming the bread or buns which are to be served with the meat while the meat is being cooked.

Therefore, an object of this invention is to provide an outdoor grill with a bread warmer.

Another object of this invention is to provide a bread warmer which is adaptable to be mounted on almost any outdoor grill.

A further object of this invention is to provide an outdoor grill with a bread warmer which is simple in structure and economical to manufacture.

A further object of this invention is to provide a barbeque grill with a bread warmer which is adaptable to be selectively moved across the lower exposed surface of the barbeque grill.

Other objects and advantages of this invention will become apparent when the following detailed description is read in conjunction with the appended drawings, specification and claims. Preferred embodiments of this invention will now be described with reference to the accompanying drawings, in which:

The invention as herein described is shown as being attachable to a standard circular barbeque grill. It is to be noted that this improvement may be attached to any barbeque grill having a charcoal receptacle which has an outer exposed bottom surface. The bread warmer is comprised generally of a piece of sheet metal preferably having a reflective coating on the bread receiving surfaces thereof. The sheet metal is shaped to form substantially a trapezoidal horizontal surface having vertical side walls extending upwardly from the convergingly oriented sides of the trapezoid. The major base of the trapezoid may be arcuated in shape to conform with the outer periphery of a charcoal grill. Each vertical surface is provided with a laterally extending flange which is adapted to be received by the lower exposed surface of the charcoal grill. The lateral flanges may be secured to the grill by means of bolts or may have magnets rigidly secured thereto which are magnetically attracted to the ferrous charcoal receptacle. By providing the flanges with magnets, the bun warmer is adapted to be movably positioned under the charcoal grill so that the bread will be in vertical alignment with the burning coals in the charcoal receptacle. The mobility of the bread warmer is desirable for when small quantities of meat are being cooked only a portion of the receptacle is filled with charcoal. The bread warmer is provided with a trapezoidal shape so that it may fit in between the legs which support the charcoal receptacle. The bread warmer of this embodiment is adapted primarily to maintain the bread at a relatively constant temperature.

A second embodiment of this invention differs from the first embodiment only in that the bread warmer is provided with a third vertical back wall which extends upwardly from the short base of the trapezoid and connects the convergingly oriented side walls. This surface reduces the flow of air through the bread warmer and adapts the same to toast buns or the like when the buns are placed in the inner recesses thereof as well as warming the same when they are placed along the outer periphery of the trapezoidal base.

The invention is illustrated in connection with the accompanying drawings in which the figures are illustrative of the preferred embodiments of the invention.

Figure 1:
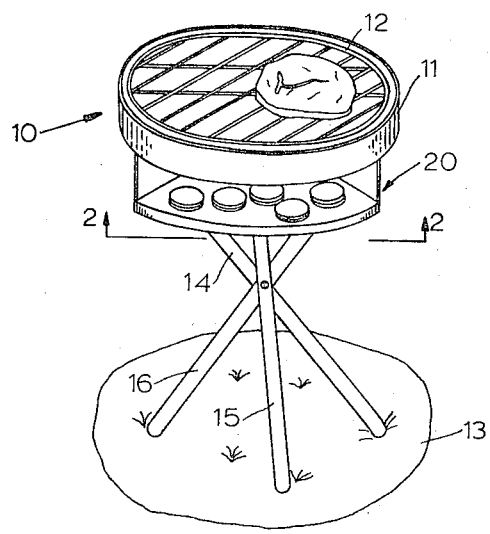
FIGURE 1 is a pictorial view of a typical outdoor barbeque grill which has been provided with a bread warmer of the type herein described.
Figure 2:
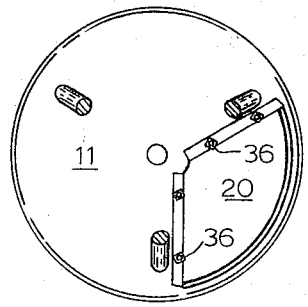
FIGURE 2 is a sectional taken along lines 2—2 of FIGURE 1 showing the lower exposed surface of the charcoal receptacle having the bread warmer attached thereto.

In reference to FIGURE 1, the charcoal grill 10 which is of a standard type includes a charcoal receptacle 11 which is bowl shaped in design and a meat receiving grid 12 supported by any convenient means (not shown) over receptacle 11. Charcoal receptacle 11 is supported above the ground 13 by legs 14, 15 and 16 which are attached to receptacle 11 (as shown in FIGURE 2) by any convenient means such as welding or the like.

Bread receptacle 20 includes a horizontal flat surface 21 which is substantially trapezoidal in shape. Trapezoidal surface 21 is defined by a major base 22, a minor base 23 and converging sides 24 and 25. Major base 22 may be arcuated in shape so as to conform with the peripheral edge of charcoal receptacle 11 and may be provided with a vertically and downwardly extending integral flange 26. Bread receiving surface 21 is provided with a vertically and upwardly extending integral wall 28 which functions as one side wall of bread warmer 20. Surface 28 has a laterally and outwardly extending flange 29 which has holes 30 and 31 perpendicularly located therein. Bread receiving surface 21 has a second vertical and upwardly extending integral side wall 32 which also has a flange 33 laterally and outwarly extending therefrom, lateral flange 33 being provided with holes 34 and 35 perpendicularly mounted therein. Flanges 33 and 29 are adapted to seat against the lower exposed surface of charcoal receptacle 11 and be secured thereto by nut and bolt arrangements 36 as shown in FIGURE 2. As an alternative embodiment of this invention, lateral flanges 33 and 29 may be provided with a plurality of magnets 37 which eliminate the need for holes 34, 35, 31 and 30. By employing magnets, bread warmer 20 is adapted to be positioned at any desired location on the lower exposed surface of charcoal receptacle 11. Also, magnets 37 eliminate the need for drilling holes in the lower surface of charcoal receptacle 11 which receives nut and bolt arrangements 36 and, furthermore, magnets 37 adapt bread warmer 20 to be received by any charcoal grill having a substantially flat lower charcoal receiving surface.

Figure 4:
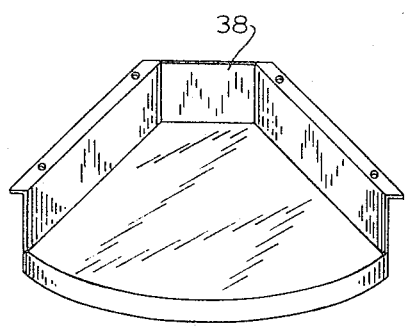
FIGURE 4 is a pictorial view of a second embodiment of the bread warmer showing the bread receiving surface being enclosed by two side walls and a back wall.
Figure 5:
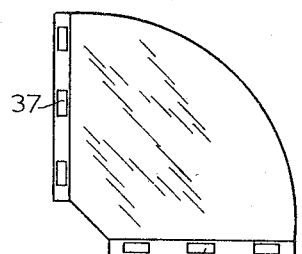
FIGURE 5 is a plan view of the bread warmer showing a plurality of magnets which are mounted on the laterally extending flanges for attaching the bread warmer to the lower exposed surface of a charcoal grill.
Figure 3:
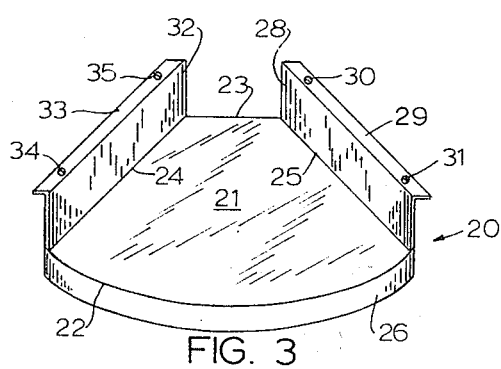
FIGURE 3 is a pictorial view of one embodiment of the bread warmer showing the bread receiving surface being enclosed by two side surfaces.

To further increase the utility of this invention, minor base 23 of bread receiving or horizontal surface 21 may be provided with a vertically and upwardly extending back wall 38 as shown in FIGURE 4. Back wall 38 may be made integral with bread receiving surface 21 and secured to side walls 32 and 25 or it may be integrally attached to either of side walls 32 and 25 and connected to the other and horizontal surface 21. Vertical back surface 38 in combination with side surfaces 32 and 25 traps the radiant energy produced by the coals in charcoal receptacle 11 and cooks or toasts bread when the bread is placed substantially in the rear portions of bread warmer 20 adjacent back 38. Where back wall 38 is employed, buns may be warmed but not toasted by placing them along the periphery of arcuated major base 22 of bread receptacle or horizontal surface 21 so that the radiant heat produced by charcoal receptacle 11 is diffused with atmospheric air thereby reducing the heat received from charcoal receptacle 11 by the bread.

Many different embodiments of this invention may be made without departing from the scope and spirit thereof. Therefore, it is to be understood that the invention is not to be limited to the specific embodiments shown and described herein, except as defined in the appended claims.

I claim:
1. In combination with an outdoor barbeque grill which includes a charcoal receptacle having an exposed and substantially planar lower surface, an apparatus for warming bread and the like comprising a substantially trapezoidal shaped horizontal surface having a major and minor base edges and a pair of convergingly oriented side edges; first and second vertically positioned, upwarly extending side walls integrally connected to respective convergingly oriented side edges of said horizontal surface, said vertical walls each having a laterally and outwardly directed flange being an integral extension thereof; and means for connecting said flanges to said exposed lower surface of said charcoal receptacle whereby said horizontal surface is positioned to receive the radiant energy given off by the burning charcoal.

2. The apparatus for warming bread of claim 1 wherein said flanges are connected to said lower surface of said charcoal receptacle by a nut and bolt arrangement.

3. The apparatus for warming bread of claim 1 wherein said flanges are provided with a plurality of magnets, said magnets being adapted to selectively and rigidly secure said bread warmer to said lower exposed surface of said charcoal receptacle.

4. The apparatus for warming bread of claim 1 wherein said minor base edge of said horizontal surface has upwardly extending therefrom a vertically positioned back wall, said back wall having disposed and parallel vertical sides being contiguous with said upwardly extending first and second side walls so as to form an enclosure.

5. The apparatus for warming bread of claim 4 wherein said flanges are provided with a plurality of magnets, said magnets being adapted to selectively and rigidly secure said bread warmer to said lower exposed surface of said charcoal receptacle.

6. The apparatus for warming bread of claim 5 wherein said horizontal surface, said first and second side walls and said back surface are provided with a reflective coating.

References Cited by the Examiner

UNITED STATES PATENTS

| 187,744 | 2/1877 | Yourtee | 126—55 X |
| 2,154,165 | 4/1939 | Huntington | 126—25 |

FREDERICK KETTERER, *Primary Examiner.*